Patented Aug. 8, 1939

2,168,660

UNITED STATES PATENT OFFICE 2,168,660

SALTS OF DIHEXAHYDROCRESYL SULPHO-PHTHALATES

Otto Albrecht, Basel, Switzerland, assignor to Society of Chemical Industry in Basle, Basel, Switzerland No Drawing. Application January 26, 1934, Serial No. 708,511. In Switzerland January 30, 1933

1 Claim. (Cl. 260—470)

The present invention relates to new salts of carboxylic acid esters deriving from aromatic sulphodicarboxylic acids. It comprises the new salts themselves as well as the compositions of matter which contain these salts or are composed in such a manner that when used in aqueous solution, such solutions are formed which contain, on the one part, definite metal ions as cations, and, on the other part, the acid radicals of carboxylic acid esters of the aromatic sulphodicarboxylic acids as anions. The new salts or the new compositions of matter are valuable assistants in the treatment of materials in the textile, leather and allied industries for the purpose of promoting wetting, dispersion or dissolution.

It has been observed that compounds which may be described as salts of those stable metals of the even series of the second and third group of the periodic system of the elements, and are derived from esters of aromatic sulphodicarboxylic acids and organic compounds containing at least one hydroxy group such as an alcoholic or phenolic hydroxy group and more than two carbon atoms and in which the hydroxy group is bound to such a carbon atom which is attached to oxygen atoms only with one valency, have a high degree of capacity for promoting wetting, dispersion or dissolution. Stable metals are called those metals which do not undergo a radioactive decomposition.

For the purpose of making the aforesaid compounds the free ester-acids, i. e. the compounds containing at least one carboxylester group and one $SO_3H$-group, are treated with the oxide, hydroxide or carbonate of the respective metal. Alternatively, the acid or normal salts of the metals of the even series of the second or third group of the periodic system of the elements derived from the aromatic sulphodicarboxylic acid or the sulphonic acid of the corresponding dicarboxylic acid anhydride may be esterified with the hydroxy-compound, if desired with the addition of hydrogen chloride, sulphuric acid or the like.

The manufacture may start from such carboxylic acid esters as are derived on the one hand from sulphonated benzene dicarboxylic acids or their substitution products, such as sulphophthalic acids, sulphoisophthalic acids, sulphoterephthalic acids, chloro-sulphophthalic acids or sulphonaphthalic acids, and on the other hand from isopropyl alcohol, butyl alcohol, amyl alcohol, hexyl alcohol, octyl alcohol, lauric alcohol, cetyl alcohol, octadecyl alcohol or oleyl alcohol, or homologues or isomerides thereof. Other esters which come also into question are those obtainable by using in the esterifying process phenol, chlorophenols, cresols and other homologues, chlorocresols, naphthols, hydrogenation products of phenol or of cresols (e. g. ortho-, para- or meta-cresol or crude cresol), or of their homologues, hydroxyamines, hydroxyethers, keto-alcohols, benzyl alcohol or any other organic hydroxy-compound having more than two carbon atoms.

The alkali salts of the said esters such as the sodium, potassium or ammonium salts, or still the calcium, strontium, barium, zinc, aluminium or magnesium salts may be mixed with various water-soluble salts which contain polyvalent metals; for example, with magnesium sulphate, calcium chloride, barium chloride, aluminium sulphate or nitrate, nitrates of the alkaline earths or water-soluble nitrates of other metals, or with water-soluble phosphates or borates of polyvalent metals. The said salts are used preferably in a proportion which is not smaller than 10 per cent. However, essentially larger proportions may be used. The metals calcium, magnesium and aluminium are called polyvalent metals the atomic weight of which amounts to 24 to 41.

As already mentioned, for making the new salts of aromatic sulphodicarboxylic acid esters, the acid or normal salts of the metals of the even series of the second and third group of the periodic system derived from aromatic sulphodicarboxylic acids or sulphonates of the corresponding carboxylic acid anhydrides may be esterified with the hydroxy-compounds in question, if desired with the aid of hydrogen chloride, sulphuric acid or the like.

Alternatively, the free sulphonic acids of the aromatic dicarboxylic acid esters may be neutralized by means of oxides, hydroxides or carbonates of the metals of the even series of the second and third group of the periodic system, for example by means of calcium carbonate, magnesium oxide, aluminium hydroxide or barium hydroxide. As shown by the preceding examples these metals of the even series of the second and third group of the periodic system of the elements belong to those groups of the periodic system of the elements which contain the bivalent and trivalent metals.

The new metal salts of the said esters, as compared with the alkaline metal or ammonium salts, have an enhanced wetting effect, solvent power and dispersive power; also an addition to the alkali or ammonium salts of the sulphonated carboxylic acid ester of inorganic metal salts of metals of the even series of the second or third group of the periodic system of the elements acts in the same sense.

The products indicated above, owing to their remarkable wetting, cleaning, dispersing and solvent properties, are suitable for the numerous purposes of the textile, leather, paper and allied industries, for example for promoting the wetting of materials which can be wetted only with difficulty, for dispersing sparingly soluble substances, as additions to dye-baths or the like purposes.

The products may be used alone or together with other substances applied in the industries, such as bleaching agents, solvents, protective colloids, agents for protecting fiber or the like.

The present invention is advantageously carried out in practice for example by using a composition of matter consisting of a mixture of at least two water soluble salts whose cations derive from metals of the even series of the second and third group of the periodic system of the elements, and whose anions correspond, on the one part, to the inorganic acid radicals and, on the other, to acid radicals of such esters which are obtained from aromatic dicarboxylic acids containing sulphonic groups by esterification with organic hydroxy compounds containing more than 2 carbon atoms. Another application of the invention consists in using solutions hitherto unknown which are formed by dissolving the new salts or by dissolving the above composition of matter. These new aqueous solutions are characterized by the fact that they contain, on the one part, ions of the metals of the even series of the second and third group of the periodic system, and, on the other part, ions of the carboxylic acid esters of the aromatic sulphodicarboxylic acid esters.

The following examples illustrate the invention, the parts being by weight (unless otherwise stated):

Example 1

Phthalic acid anyhdride is converted into 4-sulphophthalic acid anhydride by heating it with sulphur trioxide, and is then freed from the greater part of the excess of sulphonating agent used; it is now mixed, at about 60° C. with amyl alcohol. As amyl alcohol there may be used for example the mixture of amyl alcohols produced by fermentation or the synthetic product known by the trade-mark "Pentasol". After a short heating at 120° C., the mass is allowed to cool and neutralized with milk of lime. A small quantity of precipitated calcium sulphate is filtered and the filtrate is evaporated to dryness, preferably in a vacuum. There is obtained a yellowish powder which is easily dissolved by water to form a clear solution which foams strongly when shaken; this solution has an essentially higher power of promoting wetting than has a solution of the same strength of the corresponding sodium salt.

The calcium salt of 4-sulphophthalic acid which has been esterified with amyl alcohol may be used for example in dyeing cotton in the foulard machine. There is used, for instance, a dyestuff solution which contains, per liter, 1 gram of Direct Violet (Schultz, Farbstofftabellen, 7th edition, Vol. I, No. 397) and 5 grams of the said calcium salt. After a single passage through the bath there is obtained a uniform dyeing, whereas without the presence of the added calcium salt the dyestuff solution is absorbed by the material to be dyed only irregularly.

Example 2

The amylester of sulphophthalic acid obtained as described in Example 1 is neutralized with sodium hydroxide solution instead of with milk of lime and evaporated to dryness. The powder thus obtained is ground with an equal weight of calcined sodium sulphate. There is obtained a practically colorless powder which dissolves easily and clearly in water. The aqueous solution foams strongly when shaken and has an essentially enhanced power of promoting wetting and dispersion than has a solution of the same strength of the pure sodium salt.

The product is therefore applicable with advantage for making fat-removing emulsions, such as are required for removing mineral oil spots or for cleaning wool which is stained with pitch. An emulsion suitable for this purpose is obtained, for example, by shaking 100 parts by volume of benzene with a solution of 9 parts of the product described above in 100 parts by volume of water, and diluting with water to 1000 parts by volume. The emulsion thus obtained is more stable than one prepared without the addition of the salt.

A like increase of the power to promote wetting and dispersion is also to be noted when there is added to the organic ester crystallized magnesium sulphate or another salt.

Example 3

The monosodium salt of 4-sulphophthalic acid anhydride is converted, for example by heating with methylcyclohexanol obtained by perhydrogenation of crude cresol, into the sodium salt of the methylcyclohexyl ester, and the product is mixed with an equal weight of magnesium sulphate. There is obtained a practically colorless powder, which, in water for example, has an excellent wetting power. The addition of salt in this case also produces an essential increase of the surface activity.

For wetting cotton yarn or wool yarn in an aqueous liquid there may be used, for example, a solution containing per liter 1 gram of this product. The yarn is very rapidly wetted, even at the ordinary temperature.

Example 4

For bleaching raw cotton there is used a calcium hypochlorite solution which contains per liter 2 grams of active chlorine and 2 grams of a mixture made by mixing 7 parts of calcined Glauber's salt with 3 parts of the sodium salt of sulphophthalic acid which has been esterified with crude cresol. When immersed in this bleaching liquor cotton is at once wetted and quickly bleached. The wetting capacity of the liquor is not lost, even after the liquor has been standing for several days.

What I claim is:

As assistants in those industries which use wetting, dispersing and dissolving agents, the aqueous solutions containing as cations the ions of metals of the group consisting of magnesium, calcium and barium and as anions the ions of the esters of sulphonated phthalic acid whose carboxylic groups are esterified with hexahydrocresol.

OTTO ALBRECHT.